United States Patent
Eriksson et al.

(10) Patent No.: US 11,229,961 B2
(45) Date of Patent: Jan. 25, 2022

(54) CUTTING INSERT AND SHOULDER MILLNG TOOL

(71) Applicant: SANDVIK INTELLECTUAL PROPERTY AB, Sandviken (SE)

(72) Inventors: Thomas Eriksson, Falun (SE); Jorgen Jansson Udd, Gavle (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 291 days.

(21) Appl. No.: 16/472,725

(22) PCT Filed: Nov. 10, 2017

(86) PCT No.: PCT/EP2017/078839
§ 371 (c)(1),
(2) Date: Jun. 21, 2019

(87) PCT Pub. No.: WO2018/114131
PCT Pub. Date: Jun. 28, 2018

(65) Prior Publication Data
US 2019/0321898 A1    Oct. 24, 2019

(30) Foreign Application Priority Data
Dec. 22, 2016 (EP) ...................................... 16206346

(51) Int. Cl.
*B23C 5/02*    (2006.01)
*B23C 5/20*    (2006.01)
(Continued)

(52) U.S. Cl.
CPC .............. *B23C 5/2247* (2013.01); *B23C 5/06* (2013.01); *B23C 2200/0477* (2013.01);
(Continued)

(58) Field of Classification Search
CPC ....... B23C 2200/0411; B23C 2200/128; B23C 2200/201; B23C 2200/205;
(Continued)

(56) References Cited

U.S. PATENT DOCUMENTS 5,971,672 A  * 10/1999  Hansson ................. B23C 5/202
                                                                    407/113
6,336,776 B1 *  1/2002  Noggle ................... B23C 5/202
                                                                    407/114
(Continued)

FOREIGN PATENT DOCUMENTS

| CN | 104759675 A | 7/2015 |
|---|---|---|
| EP | 0587109 A1 | 3/1994 |
| EP | 2394766 A1 | 12/2011 |
| WO | 2007133437 A2 | 11/2007 |

(Continued)

*Primary Examiner* — Nicole N Ramos
(74) *Attorney, Agent, or Firm* — Corinne R. Gorski

(57) ABSTRACT

A cutting insert and a shoulder milling tool are disclosed. The cutting insert includes a surface-wiping secondary cutting edge inclined in relation to a median plane of the cutting insert such that a distance to the median plane decreases in a direction toward a corner cutting edge. The corner cutting edge, as seen in a side view along the median plane and towards a main cutting edge, has a concave curve.

14 Claims, 7 Drawing Sheets

(51) Int. Cl.
*B23C 5/22* (2006.01)
*B23C 5/06* (2006.01)

(52) U.S. Cl.
CPC .. *B23C 2200/208* (2013.01); *B23C 2200/286* (2013.01); *B23C 2210/168* (2013.01); *B23C 2210/205* (2013.01)

(58) Field of Classification Search
CPC ........ B23C 2200/208; B23C 2200/286; B23C 2210/16816; B23C 5/06; B23C 5/207; B23C 5/22; B23C 5/2221; B23B 2205/12; B23B 2205/00
See application file for complete search history.

(56) References Cited

U.S. PATENT DOCUMENTS

| | | | |
|---|---|---|---|
| 6,786,682 B1 * | 9/2004 | Wiman | B23B 27/143 407/114 |
| 2007/0071559 A1 * | 3/2007 | Koskinen | B23B 27/16 407/34 |
| 2008/0232912 A1 | 9/2008 | Bhagath | |
| 2015/0190869 A1 * | 7/2015 | Roman | B23C 5/06 407/42 |
| 2017/0080503 A1 * | 3/2017 | Koike | B23C 5/006 |

FOREIGN PATENT DOCUMENTS

| | | | | |
|---|---|---|---|---|
| WO | 2015080168 A1 | 6/2015 | | |
| WO | WO-2015117733 A1 * | 8/2015 | .............. | B23C 5/06 |
| WO | 2015174200 A1 | 11/2015 | | |
| WO | WO-2015198812 A1 * | 12/2015 | ............. | B23C 5/006 |

\* cited by examiner

CUTTING INSERT AND SHOULDER MILLNG TOOL

RELATED APPLICATION DATA

This application is a § 371 National Stage Application of PCT International Application No. PCT/EP2017/078839 filed Nov. 10, 2017 with priority to EP 16206346.5, filed Dec. 22, 2016.

TECHNICAL FIELD

The present invention relates to a cutting insert for a shoulder milling tool. The present invention further relates to a shoulder milling tool.

BACKGROUND

One or more cutting inserts are secured to a shoulder milling tool. In a shoulder milling operation, the shoulder milling tool is rotated and fed into a workpiece. A cutting edge of each of the one or more cutting inserts enters into cutting engagement with the workpiece.

Cutting inserts are available in various different shapes, most of which are indexable, i.e. they comprise more than one cutting edge and may be secured in different index positions to the shoulder milling tool. A cutting insert having a generally hexagonal shape comprising three approximately 90 degree corners is also known as a trigonal shaped cutting insert.

WO 2015/174200 discloses a trigonally shaped cutting insert comprising: a first surface and a second surface which each have a hexagonal shape and which are disposed back-to-back, lateral surfaces that run to the first surface and the second surface, and cutting edges that are respectively formed by a ridgeline at a position where the first surface and the lateral surfaces intersect, and by a ridgeline at a position where the second surface and the lateral surfaces intersect. Seat surfaces are disposed parallel and are respectively formed at the insert center side of the first surface and of the second surface; and depressions for separating the lateral surface that runs to the first surface and the lateral surface that runs to the second surface. The cutting edges are formed of a first cutting edge and a second cutting edge. The first cutting edge is longer than the second cutting edge. An end of the first cutting edge is in a position that is higher than the seat surface.

SUMMARY

It is an object of the present invention to provide a cutting insert for shoulder milling, which provides for a cutting chip flow neither causing unnecessary wear of the cutting insert, nor risking that chips get caught between a workpiece and the cutting insert, in particular at small cutting depths. Hence, it is an object of the present invention to achieve a controlled/desired chip flow or chip evacuation at small cutting depths in the shoulder milling tool.

According to an aspect of the invention, the object is achieved by a cutting insert for a shoulder milling tool, the cutting insert having a trigonal shape and a median plane extending through the cutting insert. The cutting insert comprises a first surface, an opposite second surface, and a circumferential surface extending between the first surface and the second surface, the first and second surfaces extending on opposite sides of the median plane. The cutting insert comprises at least one cutting edge extending along an intersection between the first surface and the circumferential surface, the cutting edge, as seen in a view towards the first surface, extending along a corner of the cutting insert. The at least one cutting edge comprises a main cutting edge, a corner cutting edge, and a surface-wiping secondary cutting edge, wherein the main cutting edge adjoins to the corner cutting edge, and the corner cutting edge adjoins to the surface-wiping secondary cutting edge. The surface-wiping secondary cutting edge is inclined in relation to the median plane such that a distance to the median plane decreases in a direction toward the corner cutting edge. The corner cutting edge, as seen in a side view along the median plane and towards the main cutting edge, comprises a concave curve. In said side view along the median plane and towards the main cutting edge, the concave curve of the corner cutting edge may be formed so that a lowest point on the concave curve is situated closer to the main cutting edge than the surface-wiping secondary cutting edge.

The surface-wiping secondary cutting edge is inclined in relation to the median plane such that the distance to the median plane decreases in a direction toward the corner cutting edge in order to provide a force component on the chip to direct it away from a central surface of the cutting insert, avoiding wear of the same, wherein the concave curve of the corner edge portion prevents cutting chips from flowing outwardly towards the main cutting edge where they would risk getting caught between the circumferential surface of the cutting insert and the workpiece, whereby the collective effect achieved is that cutting chips are directed away from the surface-wiping secondary cutting edge (i.e. axially upwards in the shoulder milling tool) and approximately in parallel with the main cutting edge. As a result, the above mentioned object of controlled axial chip evacuation is achieved, in particular at small/shallow cutting depths when mainly the surface-wiping secondary cutting edge and corner edge are active. At larger cutting depths when a substantial or increasing part of the main cutting edge becomes active the influence of the surface-wiping and corner edge on the chip flow direction becomes less dominant.

The cutting insert may herein alternatively be referred to simply as the insert. The cutting insert is fixed in a seat of the shoulder milling tool. Hence, the shoulder milling tool is configured for cutting a 90° shoulder in a workpiece, yet may also be used for plunge milling, i.e. for cutting in an axial direction of the shoulder milling tool into the workpiece. The median plane is an imaginary plane extending centrally in between the first and second surfaces and intersects with the circumferential surface. The main cutting edge is extending in the axial direction of the shoulder milling tool and configured for cutting the 90° shoulder or wall in the workpiece, in relation to the surface-wiping secondary cutting edge, which is extending in the radial direction of the shoulder milling tool and configured for surface-wiping the workpiece surface extending perpendicularly to the axial direction of the shoulder milling tool. The concave curve is a curve as seen from a side view along the median plane towards the main cutting edge. The side view along the median plane is seen along a direction extending perpendicularly to the main cutting edge. The trigonal shape of the cutting insert for the shoulder milling tool can provide for three cutting edges extending along the intersection between the first surface and the circumferential surface, each of the three cutting edges extending along a corner of the insert. The cutting insert is preferably a double-sided cutting insert with at least one further cutting edge (obviously it's beneficially provided with three further cutting edges) extending along an intersection between the second surface and the circumferential surface. In other words, the double-sided trigonal shape can advantageously provide a total of six indexable cutting edges to be used for shoulder milling.

The above discussed arrangement of the inclined surface-wiping secondary cutting edge and the arrangement of the concave curve of the corner edge portion is particularly efficient for directing cutting chips approximately in parallel with the main cutting edge during shoulder milling, whereby a desired axial chip flow and chip evacuation is achieved in the shoulder milling tool. In particular, for small/shallow cutting depths this effect is achieved. In other words, the effect is particularly apparent when mainly the surface-wiping secondary edge and corner cutting edge are active. The desired axial chip flow is also achieved at larger cutting depths as portions of the main cutting edge become active, but the influence from the surface-wiping secondary edge and corner cutting edge on the chip flow will gradually decrease with increasing cutting depth.

According to an embodiment, the surface-wiping secondary cutting edge extends at an average angle within a range of 1-6 degrees to the median plane, or at an average angle within a range of 2-5 degrees to the median plane, or at an angle of approximately 3.5 degrees to the median plane. This range on the angle of inclination provides a suitable force component radially outwards on the chips in order to achieve the desired axial chip flow in the shoulder milling tool.

According to an embodiment, the first surface comprises a rake face adjacent to the at least one cutting edge. The rake face comprises a primary land extending along the at least one cutting edge, the primary land having a width extending perpendicularly to the at least one cutting edge. The primary land comprises a first primary land portion adjacent to the main cutting edge, and a corner primary land portion adjacent to the corner cutting edge, and a second primary land portion adjacent to the surface-wiping secondary cutting edge. The corner primary land portion has a smaller width than the first primary land portion and the second primary land portion. In this manner the corner primary land portion can also contribute with a force component to direct cutting chips radially inwards in the same way as the concave curve of the corner cutting edge. More precisely, the combination of the inclined surface-wiping secondary cutting edge and the narrower corner primary land portion will direct cutting chips in a direction substantially in parallel with the main cutting edge during shoulder milling at small cutting depths. The corner primary land may hereby exhibit a successively decreasing width from the first and second primary land portion to a minimum width at a central part of the corner primary land portion. Said inward force component on the chips may be enhanced by providing the first primary land portion at an equal width as the second primary land portion.

According to another embodiment, the first surface comprises a flat centre surface transforming into an inclined main rake face adjacent to the main cutting edge, wherein the entire main cutting edge and the inclined main rake face extends at a greater distance from the median plane than the flat centre surface. In this way the cutting chips are easily formed along the main cutting edge by being directed downwardly from the main cutting edge and the main rake surface towards the flat centre surface. No countersunk chip breakers in relation to the centre surface or no substantial directional change is required in forming the curled chips travelling from the main cutting edge towards the flat centre surface, and thus, the chips cut by the main cutting edge will be formed and flow substantially unimpeded along the first surface. The cutting forces can hereby be reduced, while forming the curled chips and allowing unhindered chip flow compared to a cutting insert provided with countersunk chip breakers and/or where at least part of the flat centre surface is arranged above the main cutting edge, whereby the cutting insert would exhibit a topography upon which the curled chips may get caught and be prevented from being effectively evacuated. Moreover, since no chip breaker is required on the first surface, the flat centre surface may form a larger portion of the first surface. In a further embodiment, the flat centre surface may also transform into an inclined secondary rake face adjacent to the surface-wiping secondary cutting edge, wherein the entire surface-wiping secondary cutting edge and the inclined secondary rake face are arranged at a greater distance from the median plane than the flat centre surface. In this way any substantial directional changes for forming the chips from the surface-wiping secondary cutting edge are also avoided and no chip breaker is required, whereby the flat centre surface may form a relatively larger portion of the first surface, in a corresponding manner to the arrangement of the inclined main rake face and the main cutting edge.

The cutting insert may preferably be a double-sided cutting insert with a further cutting edge extending along an intersection between the second surface and the circumferential surface, each of the first and second surfaces comprising a flat centre surface for abutment against a bottom support surface of a shoulder milling tool. In particular in combination with the above mentioned embodiments the double-sided cutting insert can be securely supported by the relatively larger flat centre surfaces on the first and second surfaces respectively.

According to yet another embodiment, the main cutting edge is inclined in relation to the median plane such that a distance to the median plane decreases in a direction away from the corner cutting edge. This provides a positive inclination of the main cutting edge, whereby the main cutting edge can first engage with the workpiece closest to the corner cutting edge and thereafter gradually enter with the remaining parts of the main cutting edge, even if the insert is mounted at a negative axial rake angle in the shoulder milling tool. Thus, the chips are cut from the workpiece by the main cutting edge in a direction from the corner cutting edge and away there from along the positively inclined main cutting edge to provide smooth cutting action. The positive inclination on the main cutting edge furthermore provides an axial force component on the chips for achieving an axial chip evacuation also at relatively larger cutting depths. The main cutting edge may hereby extend at an average angle within a range of 6-14 degrees to the median plane, or at an average angle within a range of 9-11 degrees to the median plane, or at an angle of approximately 9.5 degrees to the median plane.

In a further embodiment, the circumferential surface comprises a clearance surface extending along the main cutting edge, wherein the clearance surface along the main cutting edge extends at an acute angle to the median plane, such that the clearance surface is forming a negative nominal clearance angle. Such clearance surfaces provide an increased strength on the main cutting edge compared to a cutting edge with a positive nominal clearance angle. The clearance surface along the main cutting edge may hereby extend at an acute angle within a range of 83-87 degrees to the median plane.

It is a further object of the present invention to provide a shoulder milling tool, which provides for a cutting chip flow neither causing unnecessary wear of a cutting insert, nor risking cutting chips being caught between a workpiece and the cutting insert, whereby a controlled axial chip evacuation is achieved.

According to a further aspect of the invention, this object is achieved by a shoulder milling tool comprising a tool body being provided with an insert seat for receiving a cutting insert according to any one of aspects and/or embodiments discussed herein arranged in the insert seat.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Figure 1A:
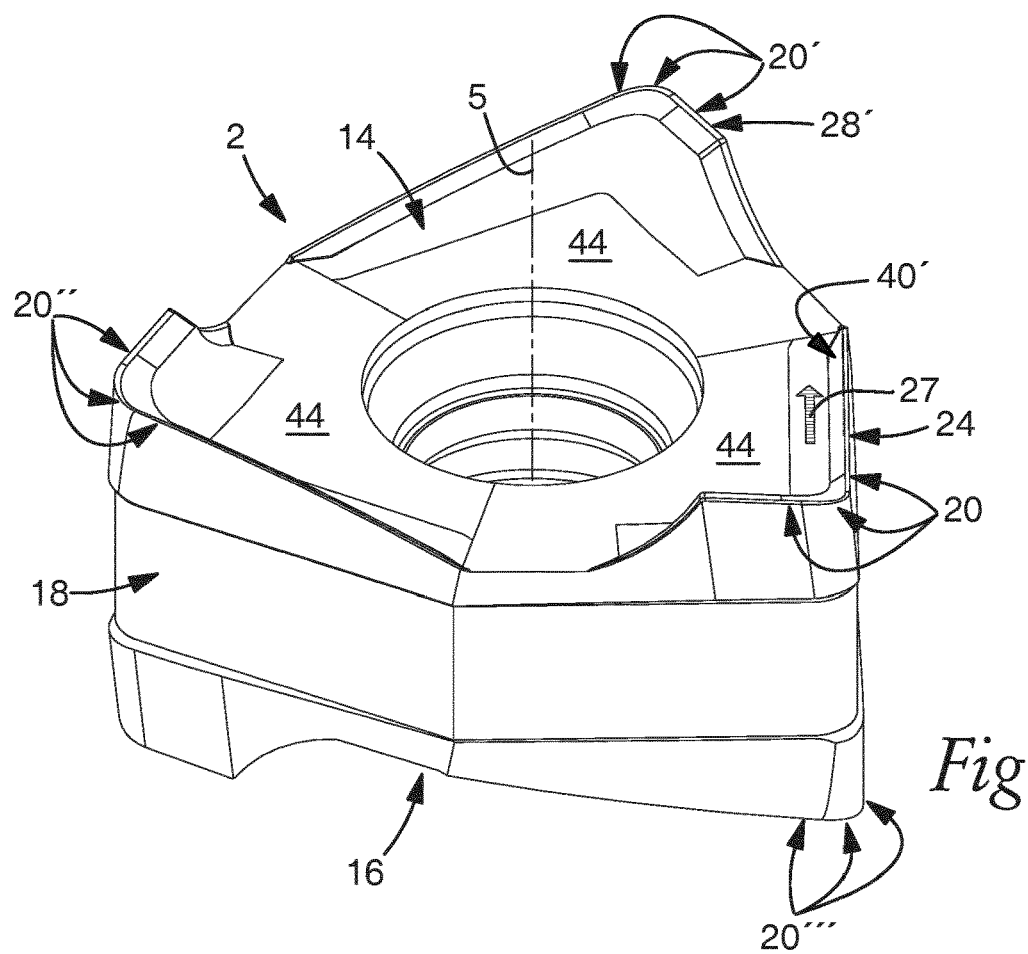
FIGS. 1a-1d illustrate various views of a cutting insert according to an embodiment.

Aspects of the present invention will now be described more fully. Like numbers refer to like elements throughout. Well-known functions or constructions will not necessarily be described in detail for brevity and/or clarity.

FIGS. 1a-1d illustrate various views of a cutting insert 2 according to an embodiment. The cutting insert 2 is configured for use in a shoulder milling tool. However, the cutting insert 2 may also be used for plunge milling. The cutting insert 2 is double-sided and six times indexable, i.e. the cutting insert 2 comprises six identical cutting edges in total, such that the cutting insert 2 can be mounted in six different index positions in the shoulder milling tool, to provide one active cutting edge at a time for milling a workpiece. The cutting insert 2 comprises a through hole 3 for screw mounting the cutting insert to the shoulder milling tool, the through hole 3 extending centrally through the cutting insert 2.

The cutting insert 2 is preferably manufactured from a cemented carbide material, but it may be manufactured from a material comprising e.g. one or more of ceramics, cubic boron nitride, polycrystalline diamond, and/or cermet. The cutting insert 2 is also preferably coated with surface coatings such as e.g. titanium nitride, titanium carbonitride, and/or aluminium oxide.

The cutting insert 2 has a trigonal shape and an imaginary median plane 4 extending through the cutting insert 2. The median plane 4 extends perpendicularly to a centre axis 5 of the through hole 3. FIG. 1d shows a cross section through the insert 2, along the median plane 4. Seen in a view towards the median plane 4, the trigonal shape has three approximately 90 degree angled corners 6 and three approximately 150 degree angled corners 8 in between the approximately 90 degree angled corners 6. An approximately 60 degree angle 10 is formed between sides 12 of two different approximately 90 degree angled corners 6.

The insert 2 comprises a first surface 14, and a second surface 16 opposite to the first surface 14, and a circumferential surface 18 extending between the first surface 14 and the second surface 16. The first and second surfaces 14, 16 extend on opposite sides of the median plane 4. The median plane 4 extends centrally in between the first and second surfaces 14, 16 and intersects with the circumferential surface 16. Put differently, the median plane 4 extends in the middle of the insert 2 with one half of the insert 2 on each side of the median plane 4. Each of the first and second surfaces 14, 16 also as a trigonal shape corresponding substantially to the trigonal shape of the median plane 4 discussed above with reference to FIG. 1d. Corners of the median plane 4 and the first and second surface 14, 16 are substantially aligned.

A cutting edge 20 extends along an intersection between the first surface 14 and the circumferential surface 18. The cutting edge 20, as seen in a view towards the first surface 14, see FIG. 1b, extends along a corner 22 of the insert 2. The corner 22 is configured for square shoulder milling and is forming a right angle or at least an approximately 90 degree corner and is arranged at one of the approximately 90 degree corners 6 of the median plane 4 shown in FIG. 1d. The corner 22 seen in the view of FIG. 1b may have a cutting insert corner radius for forming a standard corner radius in a workpiece, such as a radius of e.g. 0.8 mm, 1.2 mm or 1.6 mm. The cutting edge 20 comprises three portions; a main cutting edge 24, a corner cutting edge 26, and a surface-wiping secondary cutting edge 28. The main cutting edge 24 adjoins to the corner cutting edge 26, and the corner cutting edge 26 adjoins to the surface-wiping secondary cutting edge 28.

When arranged in the shoulder milling tool, the main cutting edge 24 is extending in an axial direction of the shoulder milling tool and is fed into a workpiece, in a radial direction of the shoulder milling tool. The surface-wiping secondary cutting edge 28 is extending in a radial direction of the shoulder milling tool and may be fed into the workpiece, in the axial direction of the shoulder milling tool. The feed is in the radial direction when a 90° shoulder is milled in the workpiece during conventional shoulder milling (without ramping), whereas during plunge milling, the feed into the workpiece is in the axial direction of the milling tool. In a shoulder milling operation, the main cutting edge 24 performs a major cut into the workpiece, while the surface-wiping secondary cutting edge 28 only performs a shallow surface smoothing cut. During plunge milling the surface-wiping secondary cutting edge 28 performs a deeper cut into the workpiece, in the axial direction of the shoulder milling tool, than during a shoulder milling operation. During plunge milling the main cutting edge 24 may also perform a substantial cut into the workpiece.

Figure 1B:
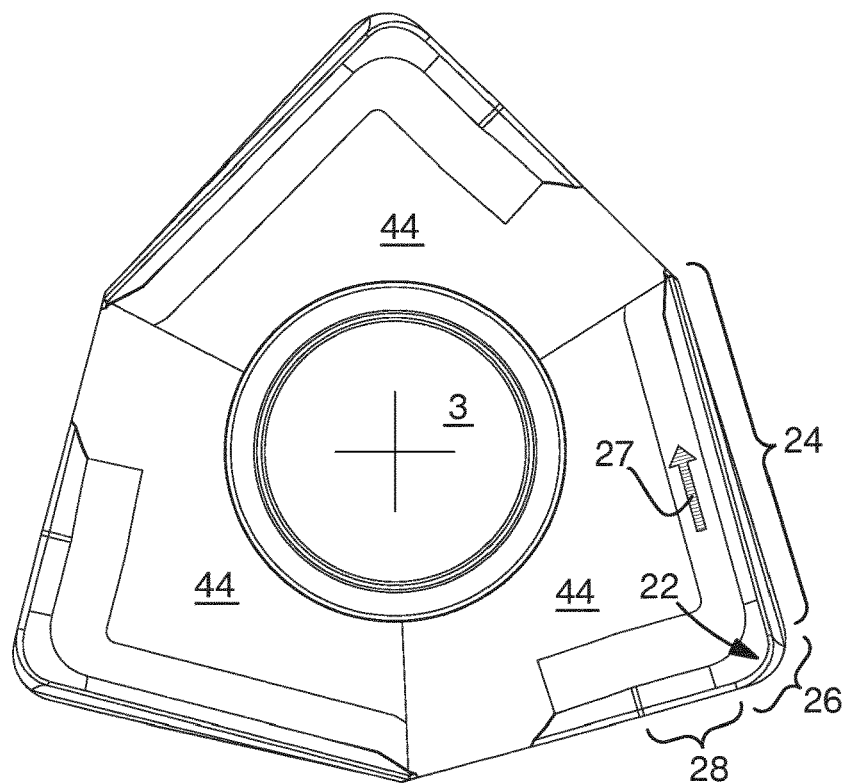
Figure 1C:
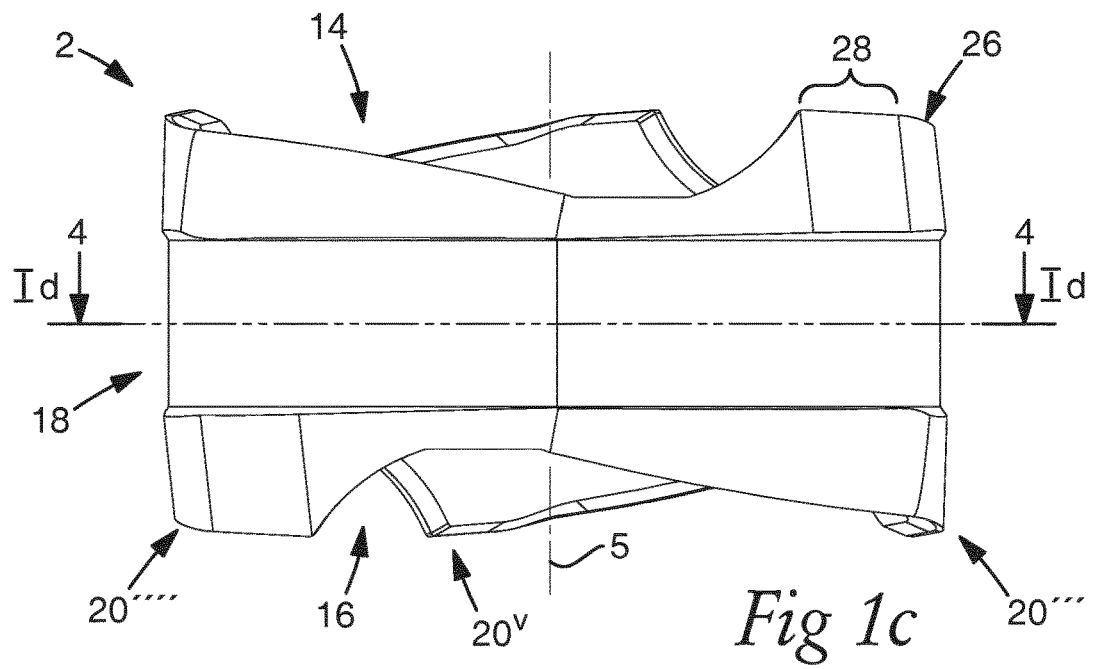
Figure 1D:
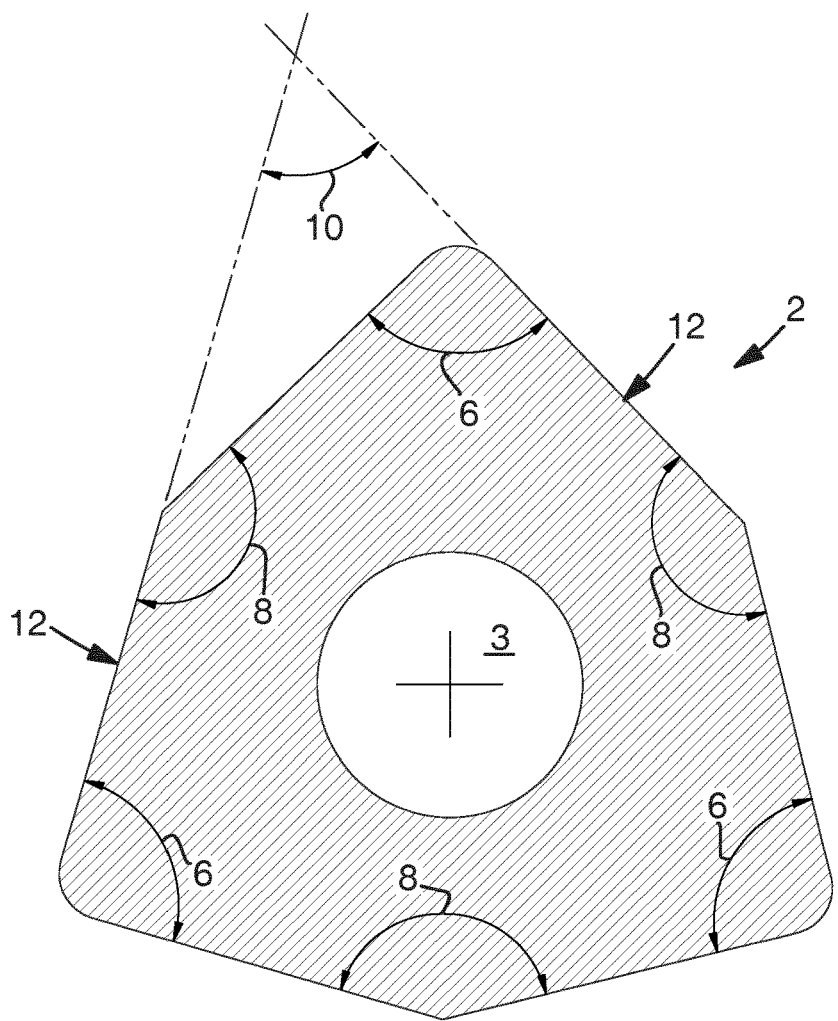
Figure 2A:
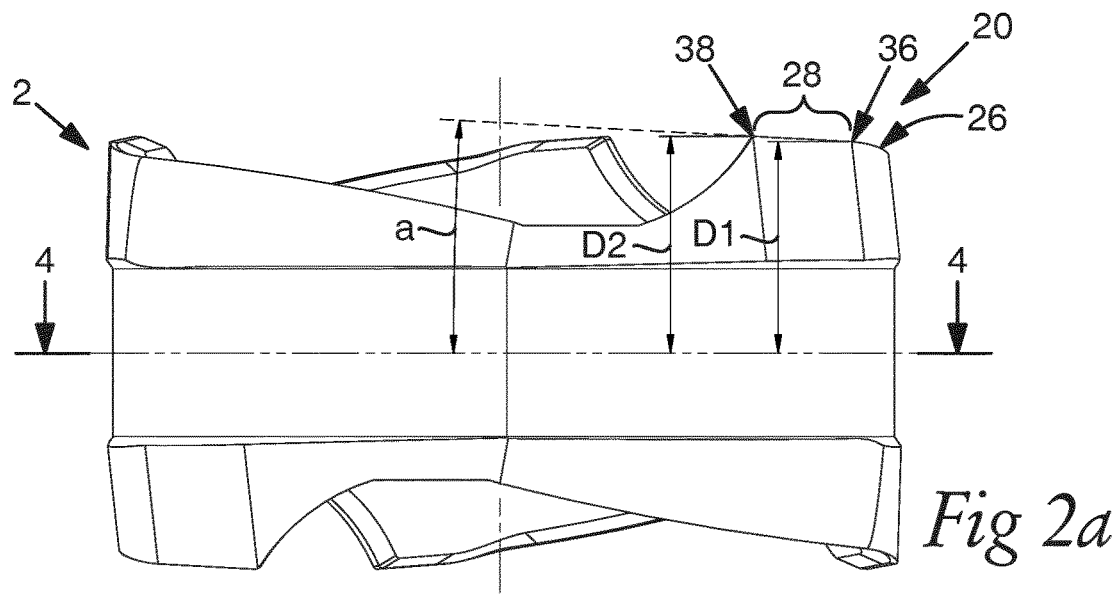
FIGS. 2a-2c illustrate further views of the cutting insert of FIGS. 1a-1d.
Figure 2B:
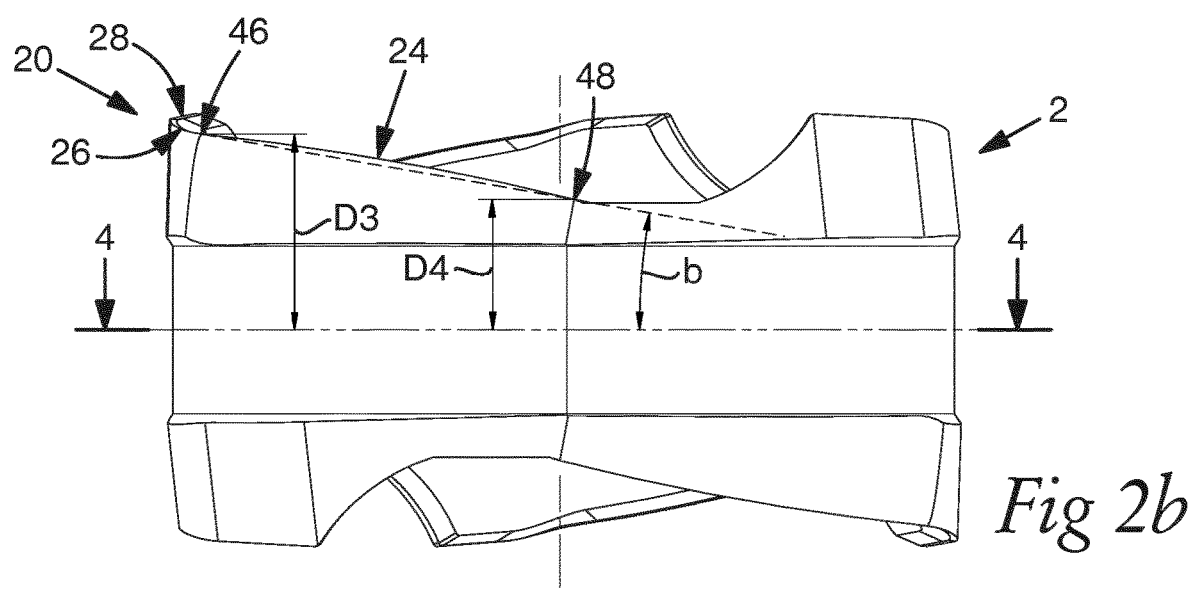
Figure 2C:
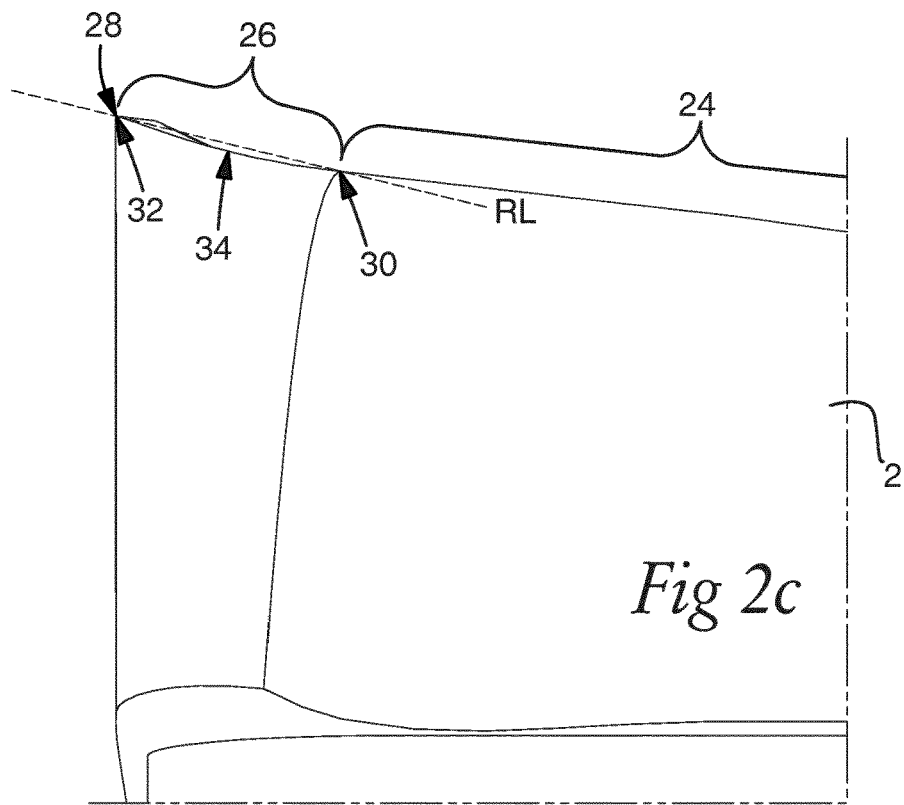
Figure 2D:
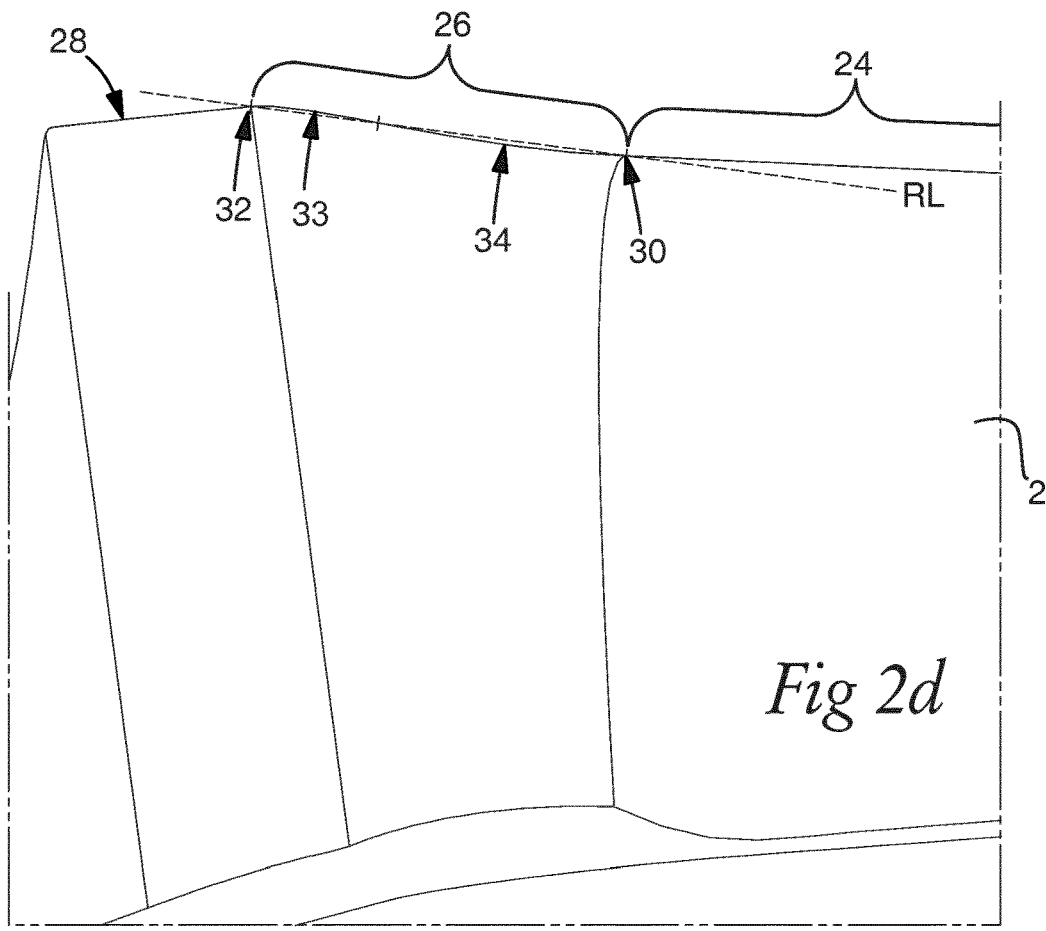

FIGS. 2a-2c illustrate views of the cutting insert 2 of FIGS. 1a-1d. In particular, the cutting edge 20 is shown in more detail in FIGS. 2a-2c. FIGS. 2a and 2b show the cutting edge 20 along the median plane 4 from two different sides of the cutting insert 2. FIGS. 2c and 2d show partial enlargements of parts of the cutting edge 20.

The surface-wiping secondary cutting edge 28 is inclined in relation to the median plane 4 such that a distance to the median plane 4 decreases in a direction toward the corner cutting edge 26. Accordingly, and as illustrated in FIG. 2a, close to the corner cutting edge 26 a first distance D1 between the surface-wiping secondary cutting edge 28 and the median plane 4 is shorter than a second distance D2 between the surface-wiping secondary cutting edge 28 and the median plane 4 farther away from the corner cutting edge 26. Due to such inclination of the surface-wiping secondary cutting edge 28, cutting chips are directed away from a central portion of the first surface 14 and towards the main cutting edge 24. Thus, cutting chips will not cause wear of the first surface 14. In particular, wear of the first surface 14, which could affect further cutting edges 20', 20" at the first surface 14 is avoided.

Seen in a view along the median plane 4 and towards the main cutting edge 24, i.e. as in FIG. 2c, the corner cutting edge 26 comprises a concave curve 34 adjacent to the main cutting edge 24. The concave curve 34 is a curve of the corner cutting edge 26 as seen in a side view of the cutting insert 2, i.e. in the direction parallel with the median plane, and along a direction perpendicularly to the main cutting edge 24. A reference line RL is illustrated in FIG. 2c in order to facilitate identification of the concave curve 34. The reference line RL extends between a transition point 30 from the main cutting edge 24 to the corner cutting edge 26 and a transition point 32 from the corner cutting edge 26 to the surface-wiping secondary cutting edge 28. This arrangement with the concave curve 34 of the corner cutting edge 26 directs cutting chips away from the main cutting edge 24. A cutting chips direction inwardly towards a centre of the first surface 14 is provided by this arrangement.

FIG. 2d illustrates another side view towards a midpoint (along a bisector) of the corner cutting edge 26 and parallel (along) the median plane 4. In this side view the concave curve 34 is also clearly visible. Again, the reference line RL extends between the transition point 30 from the main cutting edge 24 to the corner cutting edge 26 and the transition point 32 from the corner cutting edge 26 to the surface-wiping secondary cutting edge 28. The concave curve 34 of the corner cutting edge 26 connects to the main cutting edge 24 at the transition point 30 forming a convex curve in order to smoothly connect to the main cutting edge. The corner edge 26 forms another convex curve 33 next to the transition point 32 to the surface-wiping secondary cutting edge 28 in order to provide a smooth connection between the surface-wiping secondary cutting edge and the concave curve 34 of the corner edge.

Since, cutting chips are directed towards the main cutting edge 24 by the above discussed surface-wiping secondary cutting edge 28, and since the cutting chips are directed away from the main cutting edge 24, inwardly towards the first surface 14, by the above discussed curvature of the corner cutting edge 26, the collective effect is that cutting chips are directed substantially in parallel with the main cutting edge 24, i.e. substantially upwardly during milling at in particular small/shallow cutting depths using the cutting insert 2 in the shoulder milling tool. See FIGS. 1a and 1b, wherein the general direction of the flow of cutting chips is indicated with arrow 27. Thus, cutting chips will neither get caught between the circumferential surface of the main cutting edge 24 and the workpiece, nor cause unnecessary wear of other cutting edges 20', 20" of the cutting insert 2, see FIG. 1a. In particular, during shoulder milling the combination of the inclined surface-wiping secondary cutting edge 28 and the above discussed concave curvature of the corner cutting edge 26 contribute to a chip flow direction in parallel with the main cutting edge 24, whereby the chips can be evacuated axially and leave the cutting insert 2 in a region between the active main edge 24 and the adjacent inactive surface-wiping secondary edge 28' of the trigonal shaped insert 2 in the shoulder milling tool during such small cutting depths.

Returning to FIG. 2a, according to the shown embodiment, the surface-wiping secondary cutting edge 28 extends at an average angle a within a range of 1-6 degrees to the median plane 4, or at an average angle a within a range of 2-5 degrees to the median plane 4, or at an at average angel a of approximately 3.5 degrees to the median plane 4. An average angle a within the above mentioned ranges, or of approximately 3.5 degrees to the median plane 4 provides a suitable direction for cutting chips. The average angle a may be defined by an angle between the median plane 4 and a line extending between an intersection 36 between the corner cutting edge 26 and the surface-wiping secondary cutting edge 28 and an end 38 of the surface-wiping secondary cutting edge 28 opposite to the corner cutting edge 26. The surface-wiping secondary cutting edge 28 may be slightly curved.

Mentioned purely as an example, the surface-wiping secondary cutting edge 28 may have a length of approximately 1.3 mm and may be convexly curved with a radius of approximately 330 mm, seen in the view of FIG. 2a. The angle between a tangent of the surface-wiping secondary cutting edge 28 and the median plane 4 may be 3.6 degrees close to the corner cutting edge 26 and 3.4 degrees farthest away from the corner cutting edge 26, resulting in an average angel α of approximately 3.5 degrees.

Figure 3:
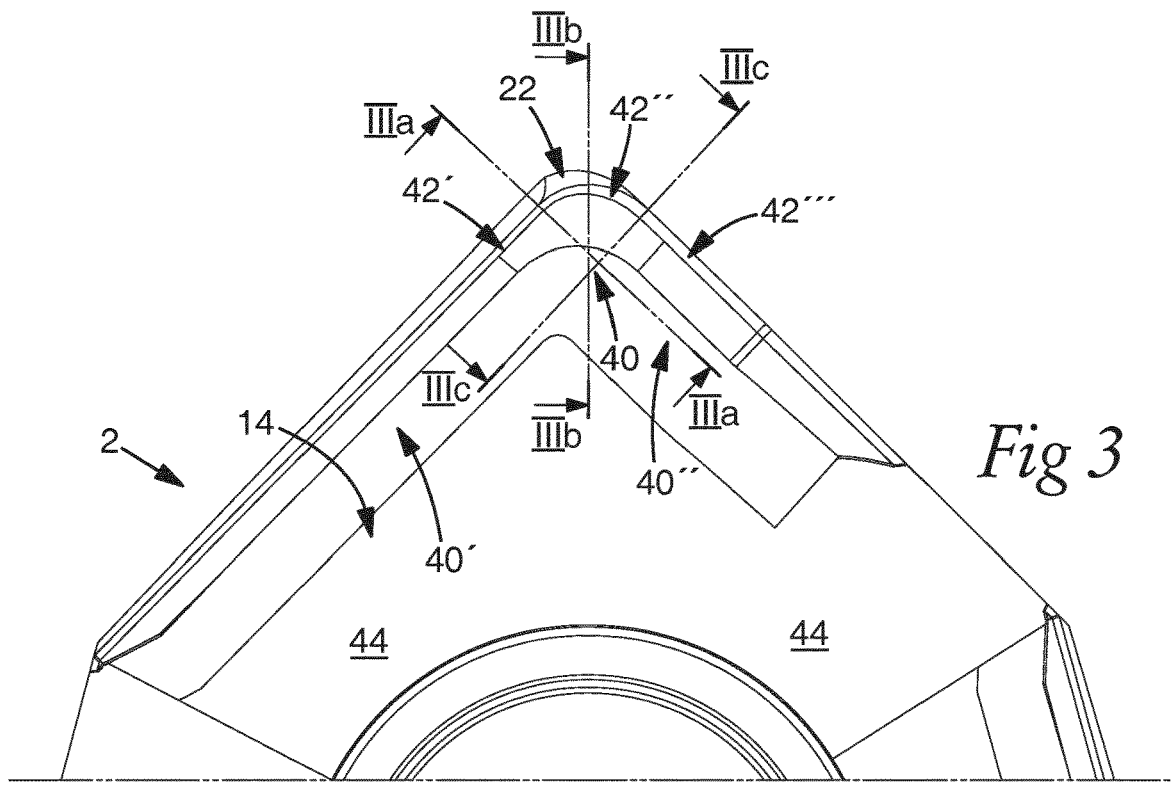
FIG. 3 illustrates a top view of the cutting insert of FIGS. 1a-1d, FIGS. 3a-3c illustrate three partial cross sections through a cutting insert.
Figure 3A:
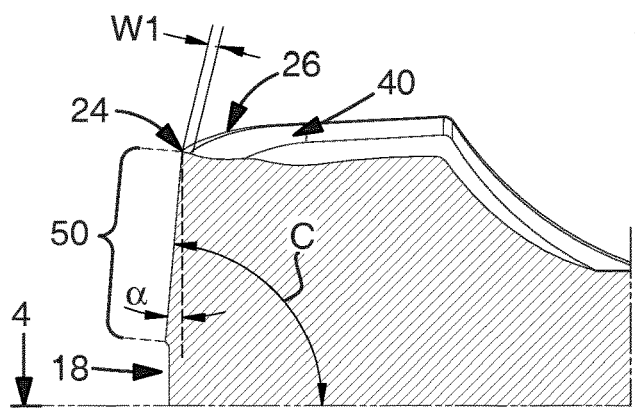
Figure 3B:
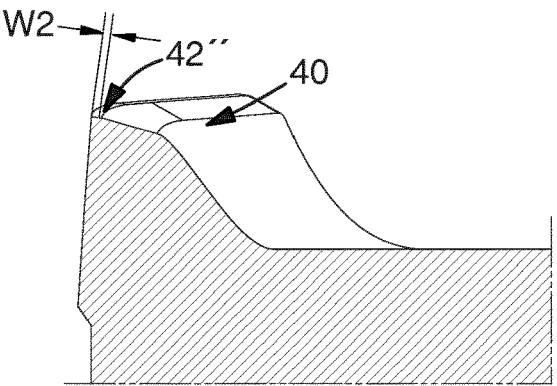
Figure 3C:
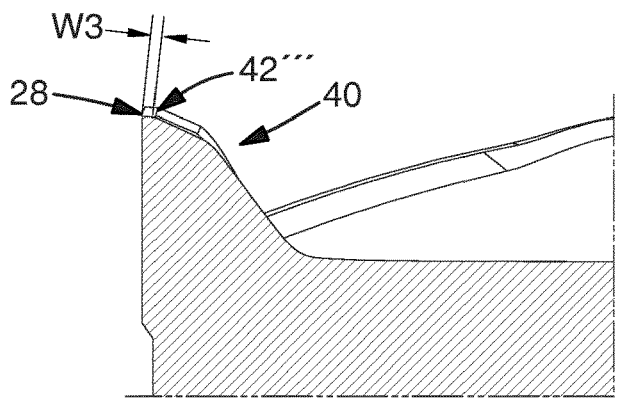

FIG. 3 illustrates a top view of the cutting insert 2 of FIGS. 1a-1d. FIGS. 3a-3c illustrate three partial cross sections through the cutting insert 2 along lines IIIa-IIIa, IIIb-IIIb, and IIIc-IIIc in FIG. 3. The first surface 14 comprises a rake face 40 adjacent to the cutting edge 20, wherein the rake face 40 has a primary land 42'-42''' extending along the cutting edge 20. The primary land 42'-42''' has a width W1-W3 extending perpendicularly to the cutting edge 20. The primary land 42'-42''' comprises a first primary land portion 42' adjacent to the main cutting edge 24, and a corner primary land portion 42" adjacent to the corner cutting edge 26, and a second primary land portion 42''' adjacent to the surface-wiping secondary cutting edge 28. The corner primary land portion 42" has a smaller width W2 than a width W1 of the first primary land portion 42' and a width W3 of the second primary land portion 42'''. The smaller width W2 of the corner primary land portion 42" than those of the first and second primary land portions W1, W3 will contribute in directing cutting chips inwardly from the cutting edge 20 towards the first surface 14. Again, together with the inclined surface-wiping secondary cutting edge 28, the cutting chips can hereby be directed in parallel with the main cutting edge 24. In particular, during shoulder milling at small cutting depths the combination of the inclined surface-wiping secondary cutting edge 28 and the smaller width W2 of the corner primary land portion 42" contribute to a chip flow direction in parallel with the main cutting edge 24.

According to the shown embodiment, the second primary land portion 42''' has a width W3 equal to the first primary land portion 42', which has the width W1. Thus, the primary land portion 42''' at the surface-wiping secondary cutting edge 28 has the same width as the primary land portion 42' at the main cutting edge 24. This, arrangement will also contribute to prevent cutting chips from being caught between the circumferential surface of the main cutting edge 24 and the workpiece.

Mentioned purely as an example, for a cutting insert 2 having a corner 22 which provides a 0.8 mm radius in a workpiece, the width W1 of the first primary land portion 42' and the width W3 of the second primary land portion 42''' may be in a range of 0.1 mm to 0.15 mm, wherein the width W2 of the corner primary land portion 42''' may be in a range of 0.08 mm to 0.14 mm at its narrowest portion. Furthermore, the primary land portion, particularly the corner primary land portion 42", may be provided at a negative angle in relation to the median plane (or an upper reference plane which is parallel to the median plane). The corner primary land portion 42" is preferably more negatively inclined if its width W2 is chosen in the lower part of the range. There is preferably a gradual transition between the relatively greater width W1 of the first primary land portion 42' and the minimum width W2 of the corner primary land portion 42", as well as between the minimum width W2 of the corner primary land portion 42" and the relatively greater width W3 of the second primary land portion 42'''.

Referring to FIGS. 1a-1c, the first surface 14 comprises a flat centre surface 44 transforming into an inclined main rake face 40' adjacent to the main cutting edge 24, wherein the entire main cutting edge 24 and the inclined main rake face 40' extend at a greater distance from the median plane 4 than the flat centre surface 44. Since the entire main cutting edge 24 and the main rake surface 40' extends at a greater distance from the median plane 4 than the flat centre surface 44, the cutting chips are easily formed along the main cutting edge 24. Cutting chips will be directed downwardly from the main cutting edge 24 and the main rake surface 40' towards the flat centre surface 44. No countersunk chip breakers in relation to the centre surface or no substantial directional change is required in forming the curled chips travelling from the main cutting edge 24 towards the flat centre surface 44, and thus, the chip flow from the main cutting edge 24 will be formed and flow substantially unimpeded along the first surface 14. Thus, the cutting forces can be reduced, while forming the curled chips and allowing unhindered chip flow compared to a cutting insert provided with countersunk chip breakers and/or where at least part of the flat centre surface 44 is arranged above the main cutting edge, whereby the cutting insert would exhibit a topography upon which the curled chips may get caught and be prevented from being effectively evacuated. Moreover, since no chip breaker is required on the first surface 14, the flat centre surface 44 may form a larger portion of the first surface 14. At least a portion of the flat centre surface 44 forms an abutment surface when the double sided cutting insert 2 is turned upside down with the first surface 14 facing an insert seat of a shoulder milling tool. Accordingly, when the flat centre surface 44 abuts against a support surface in an insert seat of a shoulder milling tool, e.g. as discussed below with reference to FIG. 5, a more stable support of the cutting insert 2 in the insert seat may be provided. Suitably, a radially outer portion of the flat centre surface 44 forms an abutment surface against a bottom support surface in the insert seat of the shoulder milling tool.

Referring to FIGS. 3-3c, the first surface 14 comprises a flat centre surface 44 transforming into an inclined secondary rake face 40" adjacent to the surface-wiping secondary cutting edge 28, and wherein the entire surface-wiping secondary cutting edge 28 and the inclined secondary rake face 40" is arranged at a greater distance from the median plane 4 than the flat centre surface 44. In this manner substantial directional changes for forming the chips from the surface-wiping secondary cutting edge 28 are avoided and no chip breaker is required, and the flat centre surface 44 may form a relatively larger portion of the first surface 14, in a manner corresponding to the arrangement of the inclined main rake face 40' and the main cutting edge 24.

The flat centre surface 44 may extend in parallel with the median plane 4, or the flat centre surface 44 may be slightly slanted towards the through hole 3, i.e. have a general slightly concave or conical shape in order to secure a stable support/abutment at the periphery of the flat centre surface 44 (i.e. prevent unstable support around the screw hole). During manufacturing of the insert 2, the flat centre surface 44 cannot be subjected to a grinding operation due to the raised cutting edges 20-20" and will inevitably include deviations from a strictly flat surface due to manufacturing tolerances. Such manufacturing tolerances will typically give rise to an unevenness that does not exceed a 0.2 mm variation seen within an area of 1 cm2 of the flat centre surface, apart from any general concave/conical shape of the flat centre surface 44. Such unevenness emanates from a manufacturing process of the cutting insert 2 involving pressing and sintering. The manufacturing process may also cause the slightly concave shape around the through hole 3, unless this is compensated for in a pressing tool for pressing the cutting insert prior to sintering the cutting insert.

The cutting insert 2 is a double-sided cutting insert with a further cutting edge 20''' extending along an intersection between the second surface 16 and the circumferential surface 18. Each of the first and second surfaces 14, 16 comprising a flat centre surface 44 for abutment against a bottom support surface of a shoulder milling tool, see also below with reference to FIG. 5. In FIGS. 1a and 1b only the flat centre surface 44 of the first surface 14 is shown. The second surface 16 comprises a corresponding flat centre surface.

Referring to FIG. 2b, the main cutting edge 24 is inclined in relation to the median plane 4 such that a distance to the median plane 4 decreases in a direction away from the corner cutting edge 26. Accordingly, and as illustrated in FIG. 2b, close to the corner cutting edge 26 a third distance D3 between the main cutting edge 24 and the median plane 4 is longer than a fourth distance D4 between the main cutting edge 24 and the median plane 4 farther away from the corner cutting edge 26. Due to such positive inclination of the main cutting edge 24, the main cutting edge 24 will first engage with a workpiece closest to the corner cutting edge 26 and thereafter gradually enter with the remaining parts of the main cutting edge 24, even when the insert 2 is mounted at a negative axial rake angle in the shoulder milling tool. Thus, cutting chips are cut from the workpiece by the main cutting edge 24 in a direction from the corner cutting edge 26 and away there from along the positively inclined main cutting edge 24 to provide smooth cutting action.

According to the shown embodiment, the main cutting edge 24 extends at an average angle b within a range of 6-14 degrees to the median plane 4, more precisely at an average angle b within a range of 9-11 degrees to the median plane 4, or at an angle b of approximately 9.5 degrees to the median plane 4. An average angle b within the above mentioned ranges, or of approximately 9.5 degrees to the median plane 4 provides a suitable gradual engagement of the main cutting edge 2 from the corner cutting edge 26 and away therefrom along the main cutting edge 24. The average angle b may be defined by an angle between the median plane 4 and a line extending between an intersection 46 between the corner cutting edge 26 and the main cutting edge 24 and an end 48 of the main cutting edge 24 opposite to the corner cutting edge 26. Mentioned purely as an example, an angle between a tangent of the main cutting edge 24 and the median plane 4 may be approximately 8 degrees close to the corner cutting edge 26 and approximately 12 degrees at the end 48 farthest away from the corner cutting edge 26, the average angle b may in this case be approximately 9.5 degrees.

Referring to FIG. 3a, the circumferential surface 18 comprises a clearance surface 50 extending along the main cutting edge 24. The clearance surface 50 along the main cutting edge 24 extends at an acute angle c to the median plane 4, such that the clearance surface 50 along the main cutting edge 24 is forming a negative nominal clearance angle α. Such clearance surfaces provide an increased strength on the main cutting edge compared to a cutting edge with a positive nominal clearance angle.

According to the shown embodiment, the clearance surface 18 along the main cutting edge 24 extends at an acute angle c within a range of 83-87 degrees to the median plane 4. In this manner a negative nominal clearance angle α within a range of 3-7 degrees is provided. More precisely, according to the embodiment, the negative nominal clearance angle α along the main cutting edge 24 is approximately 5 degrees, i.e. the acute angle c is approximately 85 degrees along the entire main cutting edge 24.

The nominal clearance angle α is the clearance angle of the clearance surface 50 measured on the cutting insert 2 as such, in relation to a normal of the median plane 4. A functional clearance angle is formed when the cutting insert 2 is secured to a shoulder milling tool, see FIGS. 4a and 4b. The functional clearance angle is always positive and is measured in relation to a cutting plane of the shoulder milling tool.

The cutting insert 2 comprises in total three cutting edges 20, 20', 20" of the same kind as the at least one cutting edge 20 as discussed herein extending along the intersection between the first surface 14 and the circumferential surface 18, and three cutting edges 20''', 20'''', 20v of the same kind as the at least one cutting edge 20 extending along an intersection between the second surface 16 and the circumferential surface 18, see FIGS. 1a and 1c. In this manner the cutting insert 2 is six times indexable in a shoulder milling tool, whereby each of the six cutting edges 20-20$^V$ can be used, one at a time until the entire cutting insert is worn out.

Figure 4A:
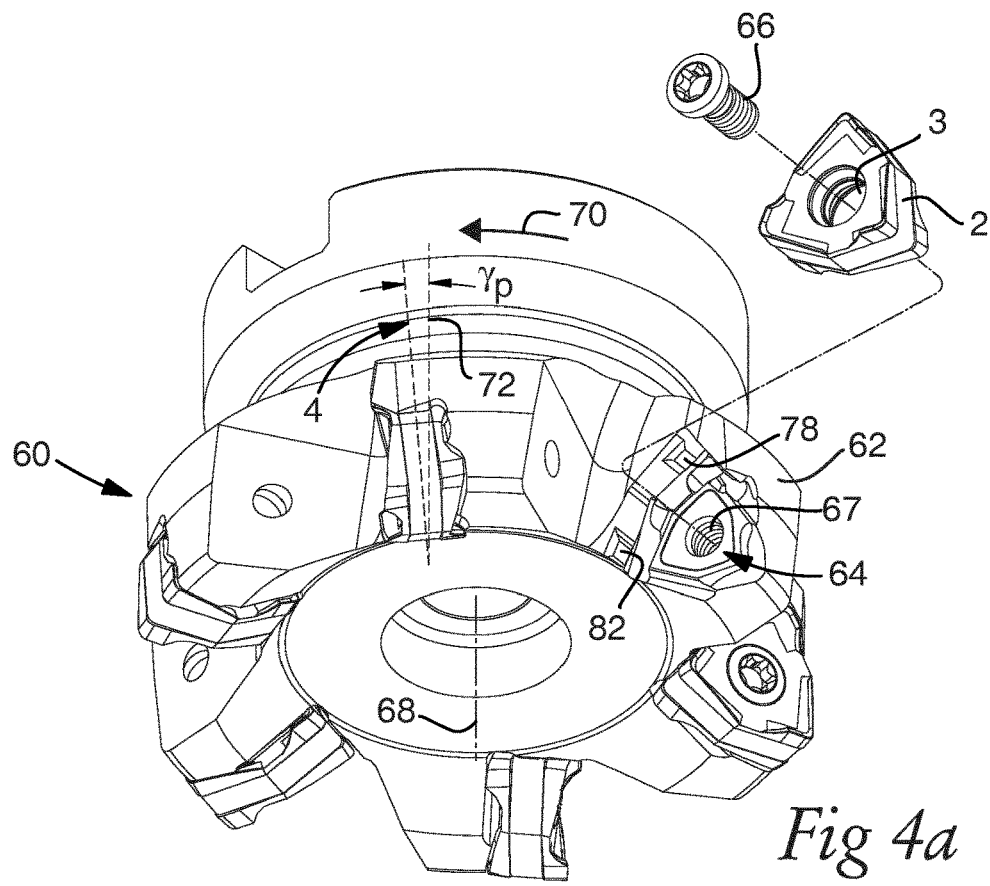
FIGS. 4a and 4b illustrate a shoulder milling tool according to an embodiment.
Figure 4B:
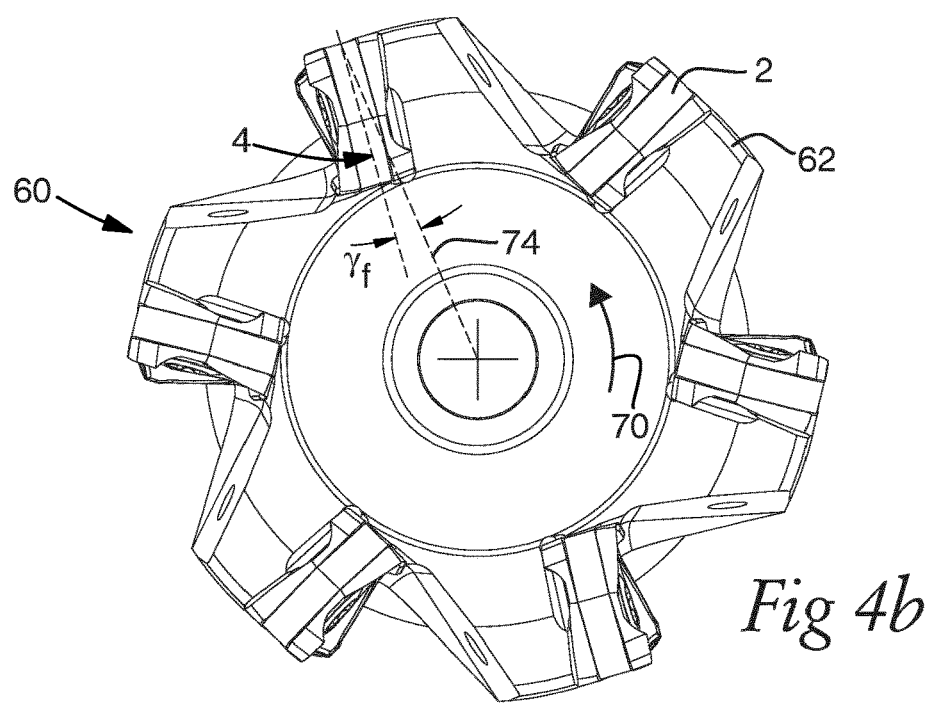

FIGS. 4a and 4b illustrate a shoulder milling tool 60 according to an embodiment. The shoulder milling tool 60 comprises a tool body 62 being provided with an insert seat 64 for receiving the cutting insert 2 described above. Thus, the shoulder milling tool 60 comprises the cutting insert 2 arranged in the insert seat 64. The cutting insert 2 is secured to the tool body 62 in the insert seat 64 by means of a screw 66 extending through the through hole 3 of the cutting inset 2. The screw 66 engages with internal threads 67 in the tool body 62. Other means of securing the cutting insert 2 to shoulder milling tool 60 may be used.

The shoulder milling tool 60 is typically provided with more than one cutting insert 2. In this embodiment the tool body 62 comprises six cutting inserts 2 arranged in six insert seats 64 of the shoulder milling tool 60. The shoulder milling tool 60 is rotatable about a central rotation axis 68 in a direction indicated by the arrow 70, wherein the cutting insert 2 is mounted for cutting into a workpiece with the main cutting edge extending in the axial direction and the surface-wiping secondary edge extending in the radial direction of the shoulder milling tool. The shoulder milling tool 60 can also be used for plunge milling, i.e. milling in the axial direction of the milling tool 60. Mentioned purely as an example, the shoulder milling tool 60 may have a diameter within a range of 32-250 mm. Obviously, the number of insert seats and cutting inserts 2 may vary depending on for instance the diameter of the shoulder milling tool and/or the operating conditions (e.g. operational stability, power consumption and workpiece material).

According to the shown embodiment, the insert seat 64 is configured to provide a negative axial rake angle γp for the median plane 4 of the cutting insert 2 arranged in the insert seat 64. The insert seat 64 is hereby configured to provide a negative axial rake angle γp within a range of 1-11 degrees, more precisely 4-8 degrees, or of approximately 6 degrees. The negative axial rake angle γp is measured between the median plane 4 of the cutting insert 2 and a line 72 extending in parallel with the rotation axis 68 (the axial direction of the shoulder milling tool) and provides an axial clearance between the clearance surface of the surface-wiping secondary edge and the workpiece during milling.

According to the embodiment, the insert seat 64 is also configured to provide a negative radial rake angle γf for the median plane 4 of the cutting insert 2 arranged in the insert seat 64. The insert seat 64 is configured to provide a negative radial rake angle γf within a range of 8-20 degrees, more precisely 11-17 degrees, or of approximately 14 degrees. The negative radial rake angle γf is measured between the median plane 4 of the cutting insert 2 and a radially extending line 74 from the rotation axis 68 (the radial direction of the shoulder milling tool). In combination with the nominal negative clearance angle α of the main cutting edge 24, discussed above with reference to FIG. 3a, a functional positive clearance angle of the main cutting edge is formed by the radial rake angle γf. For instance, the exemplified negative clearance angle α of approximately 5 degrees and the negative radial rake angle γf of approximately 14 degrees provides a functional clearance angle of the main cutting edge of approximately 9 degrees.

The surface-wiping secondary cutting edge 28 is inclined in relation to the median plane 4, as discussed above with reference e.g. to FIG. 2a. The negative radial rake angle γf for the median plane 4 of the cutting insert 2 arranged in the insert seat 64 provides for a larger inclination of the surface-wiping secondary cutting edge 28 in relation to the radially extending line 74. The exemplified approximately 3.5 degree inclination in relation to the median plane 4 together with the exemplified the negative radial rake angle γf of approximately 14 degrees provides for an approximately 17.5 degree inclination of the surface-wiping secondary cutting edge 28 in relation to the radially extending line 74.

Figure 5:
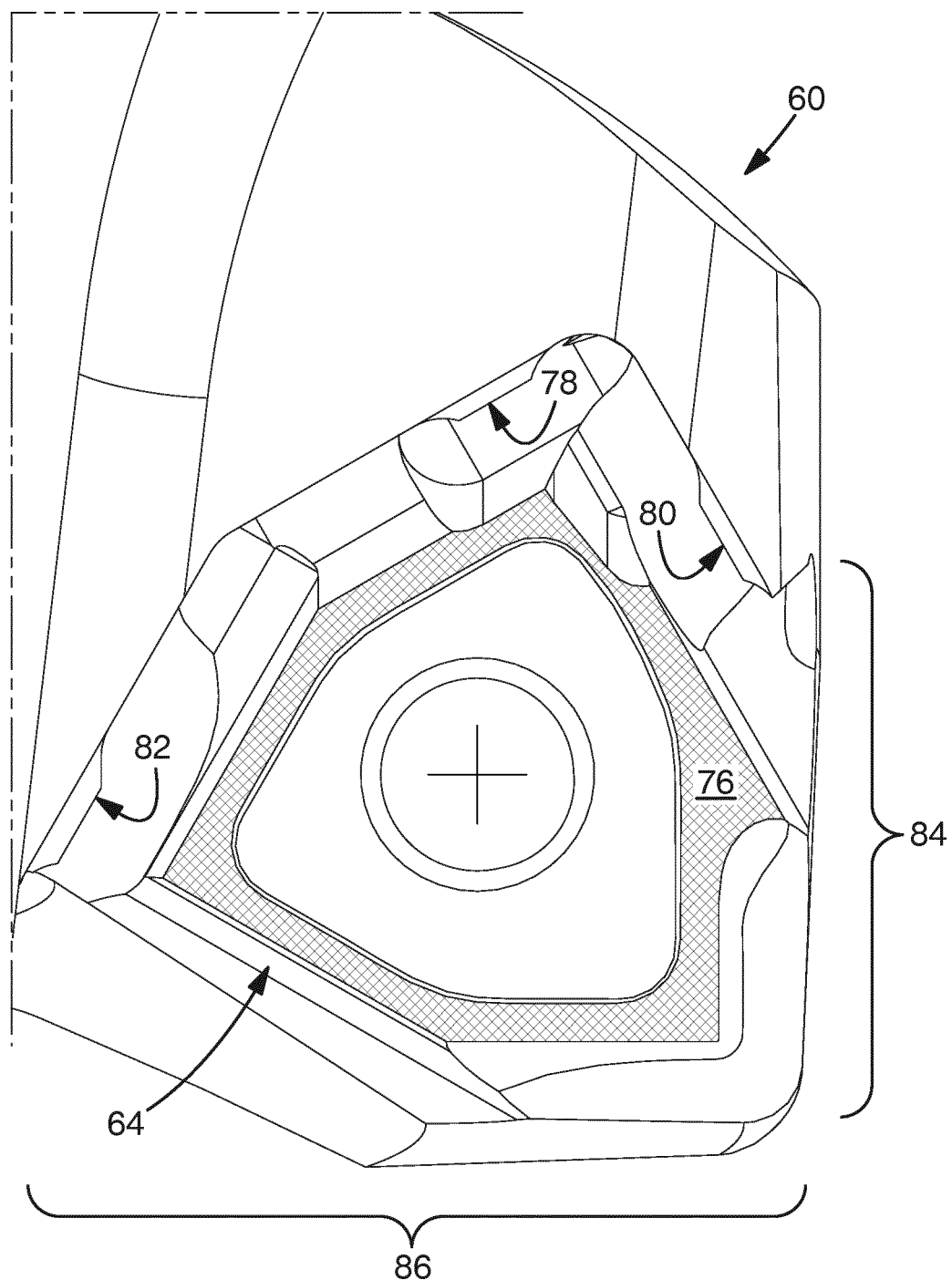
FIG. 5 illustrates an insert seat of the shoulder milling tool of FIGS. 4a and 4b.

FIG. 5 illustrates an insert seat 64 of the shoulder milling tool 60 of FIGS. 4a and 4b. The insert seat 64 is provided with a bottom support surface 76, a first side support surface 78, a second side support surface 80, and a third side support surface 82. The first and second side support surfaces 78, 82 are also shown in FIG. 4a. The bottom support surface 76 is shown as a hatched surface in FIG. 5. As can be seen the hatched surface of the bottom support surface 76 provides a raised peripheral portion of the seat to secure a stable support/abutment at the periphery of the flat centre surface 44 (avoid unstable abutment around the screw hole). The insert seat 64 obviously comprises a radial opening 84 for exposing the active main cutting edge of the cutting insert, when secured in the insert seat 64, and an axial opening 86 for exposing the active surface-wiping secondary cutting edge of the cutting insert.

The first support surface 78, the second support surface 80, and the third support surface 82 are arranged at an approximately 90 degree angle to the bottom support surface 76. The first and second support surfaces are arranged at an approximately 90 degree angle to each other at an end of the insert seat opposite to the axial opening 86, and the third support surface 82 is arranged at an end of the insert seat 64 close to the axial opening 86. The first support surface faces towards the radial opening 84. The second support surface

80 faces away from the radial opening 84. The third support surface 82 faces towards the radial opening 84.

When secured in the insert seat 64, a cutting insert 2 is arranged with at least part of the even abutment surface 44, see FIG. 1a, abutting against the bottom support surface 76. Respective portions of the waist provided in the circumferential surface 18, see FIG. 1a, abut against the first support surface 78, the second support surface 80, and the third support surface 82.

During use of the shoulder milling tool 60, the first and second side support surfaces 78, 80 form axial support surfaces for the cutting insert, the first and third side support surfaces 78, 82 form radial support surfaces for the cutting insert, and the bottom support surface 76 forms a tangential support surface for the cutting insert.

The cutting insert 2 is stably supported in the shoulder milling tool Due to the provision of the flat centre surface 44 beneath the cutting edge 20 and the lack of a chip breaker, as discussed above with reference to FIGS. 1a-1c and 3-3c, a comparatively large flat abutment surface is formed at a relatively large distance from the centre axis 5 of the insert hole, i.e. at the periphery of the flat centre surface 44, which abuts against the bottom support surface 76 of the insert seat 64.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims.

The invention claimed is:

1. A cutting insert for a shoulder milling tool, the cutting insert comprising:
    a body having a trigonal shape and a median plane extending through the body;
    a first surface, an opposite second surface, and a circumferential surface extending between the first surface and the second surface, the first and second surfaces extending on opposite sides of the median plane; and
    at least one cutting edge extending along an intersection between the first surface and the circumferential surface, the at least one cutting edge, as seen in a view towards the first surface, extending along a corner of the cutting insert, wherein the at least one cutting edge includes a main cutting edge, a corner cutting edge, and a surface-wiping secondary cutting edge, wherein the main cutting edge adjoins the corner cutting edge, and the corner cutting edge adjoins the surface-wiping secondary cutting edge, the surface-wiping secondary cutting edge being inclined in relation to the median plane such that a distance to the median plane decreases in a direction toward the corner cutting edge, and wherein the corner cutting edge, as seen in a side view along the median plane and towards the main cutting edge, includes a concave curve, wherein the first surface includes a flat centre surface transforming into an inclined main rake face adjacent to the main cutting edge, wherein an entirety of the main cutting edge and the inclined main rake face extends at a greater distance from the median plane than the flat centre surface.

2. The cutting insert according to claim 1, wherein the surface-wiping secondary cutting edge extends at an average angle within a range of 1-6 degrees to the median plane.

3. The cutting insert according to claim 1, wherein the first surface includes a rake face adjacent to the at least one cutting edge, wherein the rake face includes a primary land extending along the at least one cutting edge, the primary land having a width extending perpendicularly to the at least one cutting edge, wherein the primary land includes a first primary land portion adjacent to the main cutting edge, a corner primary land portion adjacent to the corner cutting edge, and a second primary land portion adjacent to the surface-wiping secondary cutting edge, wherein the corner primary land portion has a smaller width than a width of the first primary land portion and a width of the second primary land portion.

4. The cutting insert according to claim 3, wherein the first primary land portion width is equal to the width of the second primary land portion.

5. The cutting insert according to claim 1, wherein the flat centre surface transforms into an inclined secondary rake face adjacent to the surface-wiping secondary cutting edge, wherein an entirety of the surface-wiping secondary cutting edge and the inclined secondary rake face are arranged at a greater distance from the median plane than the flat centre surface.

6. The cutting insert according to claim 1, wherein the cutting insert is a double-sided cutting insert with a further cutting edge extending along an intersection between the second surface and the circumferential surface, each of the first and second surfaces having a flat centre surface arranged to abut against a bottom support surface of a shoulder milling tool.

7. The cutting insert according to claim 1, wherein the main cutting edge is inclined in relation to the median plane such that a distance to the median plane decreases in a direction away from the corner cutting edge.

8. The cutting insert according to claim 7, wherein the main cutting edge extends at an average angle within a range of 6-14 degrees to the median plane.

9. The cutting insert according to claim 1, wherein the circumferential surface includes a clearance surface extending along the main cutting edge, wherein the clearance surface along the main cutting edge extends at an acute angle to the median plane, such that the clearance surface forms a negative nominal clearance angle.

10. The cutting insert according to claim 9, wherein the clearance surface along the main cutting edge extends at an acute angle within a range of 83-87 degrees to the median plane.

11. The cutting insert according to claim 1, wherein the cutting insert includes three cutting edges, which are the same as the at least one cutting edge, extending along the intersection between the first surface and the circumferential surface, and three cutting edges, which are the same as the at least one cutting edge, extending along an intersection between the second surface and the circumferential surface.

12. A shoulder milling tool comprising:
    a tool body having an insert seat; and
    a cutting insert according to any claim 1 arranged in the insert seat.

13. The shoulder milling tool according to claim 12, wherein the insert seat is configured to provide a negative axial rake angle for the median plane of the cutting insert arranged in the insert seat, the negative axial rake angle being within a range of 1-11 degrees.

14. The shoulder milling tool according to claim 12, wherein the insert seat is configured to provide a negative radial rake angle for the median plane of the cutting insert arranged in the insert seat, the negative radial rake angle being within a range of 8-20 degrees.

\* \* \* \* \*